(12) United States Patent
Belloni et al.

(10) Patent No.: US 6,313,426 B2
(45) Date of Patent: Nov. 6, 2001

(54) METHOD AND APPARATUS FOR WELDING PIPES TOGETHER

(75) Inventors: Antonio Belloni, Codogno; Renato Bonasorte, Ripalta Cremasca, both of (IT)

(73) Assignee: Saipem S.p.A., San Donato Milanese (IT)

( * ) Notice: Subject to any disclaimer, the term of this patent is extended or adjusted under 35 U.S.C. 154(b) by 0 days.

(21) Appl. No.: 09/848,433

(22) Filed: May 4, 2001

Related U.S. Application Data

(63) Continuation of application No. PCT/EP99/10504, filed on Dec. 21, 1999.

(30) Foreign Application Priority Data

Dec. 24, 1998 (GB) .................................................. 9828726
Jun. 29, 1999 (GB) .................................................. 9915232

(51) Int. Cl.⁷ .................................................... B23K 9/12

(52) U.S. Cl. ........................................ 219/61; 219/125.11

(58) Field of Search ................................ 219/60 A, 60 R, 219/61, 125.1, 125.11, 124.34, 137 R

(56) References Cited

U.S. PATENT DOCUMENTS

| 2,227,194 | * 12/1940 | Moise et al. ...................... 219/60 R |
| 2,795,689 | 6/1957 | McNutt . |
| 2,956,147 | 10/1960 | Baker . |

(List continued on next page.)

FOREIGN PATENT DOCUMENTS

| 0 021 856 | 1/1981 | (EP) . |
| 0 076 018 | 4/1983 | (EP) . |
| 0 088 501 | 9/1983 | (EP) . |
| 0 262 545 | 4/1988 | (EP) . |
| 0 402 648 | 12/1990 | (EP) . |
| 0 439 975 | 8/1991 | (EP) . |
| 0 706 849 | 4/1996 | (EP) . |
| 0 852 984 | 7/1998 | (EP) . |
| 1 319 239 | 6/1973 | (GB) . |
| 2 100 642 | 1/1983 | (GB) . |
| 59-191575 | 10/1984 | (JP) . |
| 62-118976 | 5/1987 | (JP) . |
| 330 519 | 10/1998 | (NZ) . |
| WO91/09700 | 7/1991 | (WO) . |

OTHER PUBLICATIONS

Serimer DASA– Automatic Pipeline Welding, "Saturnax Dual–Torch Now we're talking".

R. A. Teale et al., "Development of pulsed GMAW for an advanced dual torch pipeline welding system", P12–1.

Copy of UK Search Reports dated Oct. 28, 1999 and Feb. 16, 1999.

Copy of International Search Report completed Jun. 8, 2000 and mailed Jun. 19, 2000.

*Primary Examiner*—Clifford C. Shaw
(74) *Attorney, Agent, or Firm*—Burns, Doane, Swecker & Mathis, L.L.P.

(57) ABSTRACT

A welding apparatus, for welding pipe sections (1, 2) together to form an underwater pipeline, is arranged to weld pipe sections (1, 2) together when they are in a generally upright orientation with the bottom of an upper pipe section (2) abutting the top of a lower pipe section (1) that defines the end of a pipeline. The welding apparatus includes a rotary equipment holder (5) mounted for rotation about a generally vertical axis (8) and having a central opening (5A) through which pipe sections (1, 2) are able to pass as a pipeline is laid, a plurality of welding heads (12) angularly spaced about the rotary equipment holder (5), each head (12) being associated with a respective sector of the rotary equipment holder, and a welding head guide assembly (11) for fixing around a pipe section (1). The guide assembly (11) includes a guide track (14) for guiding movement of each of the welding heads (12) around the pipe section (1). The respective sector of the rotary equipment holder (5) is able to revolve around the pipe section (1) as the associated welding head (12) revolves around the pipe section (1).

32 Claims, 8 Drawing Sheets

U.S. PATENT DOCUMENTS

Figure 1:
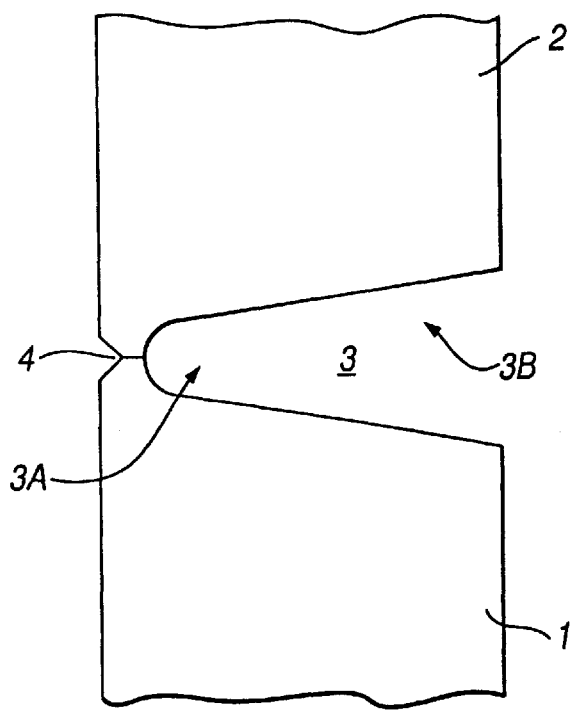

| | | |
|---|---|---|
| 3,515,843 * | 6/1970 | Arivasu et al. .................. 219/125.1 |
| 3,727,025 * | 4/1973 | Dibenedetto ........................... 219/61 |
| 3,777,115 | 12/1973 | Kazlauskas et al. . |
| 3,800,116 | 3/1974 | Tanaka et al. . |
| 4,145,593 | 3/1979 | Merrick et al. . |
| 4,151,395 | 4/1979 | Kushner et al. . |
| 4,161,640 | 7/1979 | Bromwich et al. . |
| 4,216,365 | 8/1980 | Peyrot . |
| 4,283,617 | 8/1981 | Merrick et al. . |
| 4,350,868 | 9/1982 | Takagi et al. . |
| 4,373,125 | 2/1983 | Kazlauskas . |
| 4,380,695 | 4/1983 | Nelson . |
| 4,417,126 | 11/1983 | Kasahara et al. . |
| 4,485,291 | 11/1984 | Nomura et al. . |
| 4,495,400 | 1/1985 | Thompson . |
| 4,525,616 | 6/1985 | Slavens . |
| 4,542,276 * | 9/1985 | Berg ................................. 219/60 A |
| 4,591,294 | 5/1986 | Foulkes . |
| 4,631,386 | 12/1986 | Slavens . |
| 4,990,743 | 2/1991 | Kugai et al. . |
| 5,030,812 | 7/1991 | Sugitani et al. . |
| 5,146,064 | 9/1992 | Poirier . |
| 5,347,101 | 9/1994 | Brennan et al. . |
| 6,124,566 | 9/2000 | Belloni et al. . |

\* cited by examiner

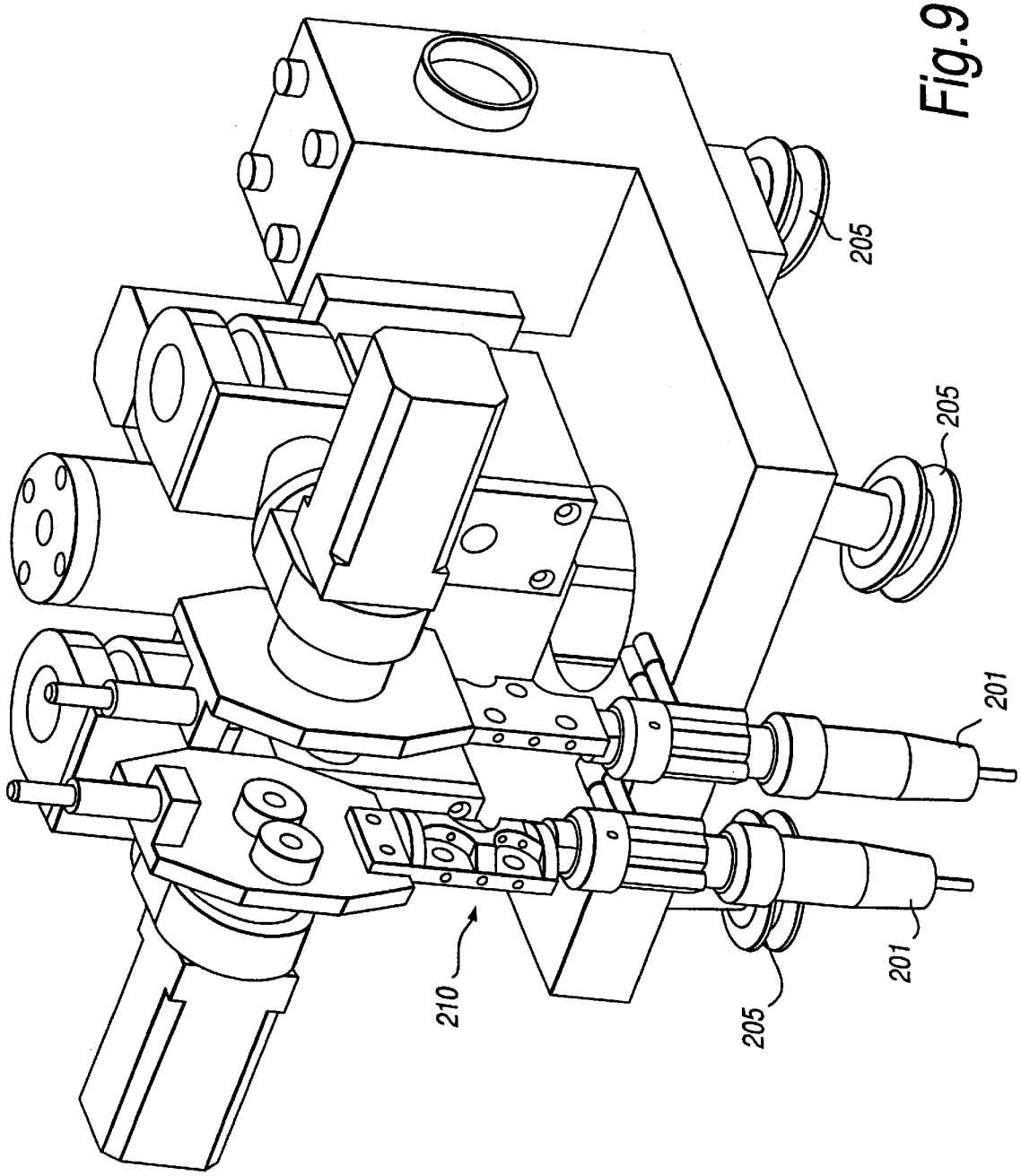

METHOD AND APPARATUS FOR WELDING PIPES TOGETHER

This application is a continuation of International Application No. PCT/EP 99/10504 filed on Dec. 21, 1999, which International Application was published by the International Bureau in English on Jul. 6, 2000, which claims priority of UK Patent Application No. 9915232.4 filed Jun. 29, 1999, which claims priority of UK Patent Application No. 9828726.1 filed Dec. 24, 1998.

BACKGROUND OF THE INVENTION

1. Field of the Invention

The present invention relates to an apparatus and method for welding pipes together. More specifically the invention relates to arc-welding together pipe sections when laying pipelines underwater, especially at sea.

2. Description of the Related Art

When laying a pipeline at sea it is customary to weld, on a lay-barge, individual pipe sections to a pipe string (the pipe string leading towards the seabed). The welding process takes place on the lay-barge. The pipe sections may consist of a plurality of pipe lengths each welded together on the lay-barge to form the pipe sections when required.

The pipe-string, when being laid, is under great tension and weld joints must, of course, necessarily be sufficiently strong to withstand the high forces imposed on the weld joints. Each time a pipe is welded to another pipe extensive tests are made to ensure that the quality of the weld joint formed is sufficient. The strength of a weld joint depends upon various factors, one being the geometry of the path traced by the point of contact of the arc in relation to the surfaces of the pipes to be joined. If the point of contact of the arc is off target by as little as a tenth of a millimeter the quality of the joint may be reduced by enough that the pipe joint is rejected, when tested, as not being of sufficient quality. It is therefore important that the weld metal is laid down in the region of the joint with great accuracy.

Furthermore the radial distance of the electrode with respect to the pipes must change in relation to the depth of the weld joint. As the region of the joint between the pipes is filled with welded metal the surface of the welded metal gets closer to the welding torch.

There are therefore special considerations that must be taken into account when designing an apparatus for welding such pipes together.

A known method of welding two pipes together may be described as follows. The pipes to be joined are prepared prior to the welding process by bevelling the ends of the pipes such that when the pipes are arranged immediately before the welding process commences (coaxially with respect to each other), an exterior circumferential groove is defined between the two pipes. The pipes are positioned ready for welding. A carriage is mounted on one of the pipes for movement around the circumference of the pipes to be joined. A welding torch is mounted on the carriage and the apparatus is so arranged that the end of the metal electrode of the torch is opposite and relatively close to the circumferential groove. The carriage is moved around the circumference of the pipe and the torch is operated so that an arc is directed into the groove. The arc is guided manually and/or by various mechanical sensors to guide the arc as accurately as possible along the length of the groove. The welding process generally takes several passes. In the above-described method the resolution of the mechanical sensors is/such that a human operator is required to assist in the welding process for guiding the arc with sufficient accuracy.

The time it takes to lay a given length of pipeline is, to a great extent, determined by the time it takes to perform all the necessary welding operations. There is therefore a benefit in reducing the time it takes to weld two pipes together. Any attempt to speed up the welding process should not however lead to a significant reduction in the quality of the weld joint.

SUMMARY OF THE INVENTION

An object of the present invention is to provide an apparatus and method for welding pipes together that mitigates at least some of the above-mentioned disadvantages associated with the known method and apparatus described above. A further object of the present invention is to provide an apparatus and method for welding pipes together that is faster at welding pipes together than the known method and apparatus described above but without significantly reducing the quality of weld joint.

According to the invention there is provided a welding apparatus for welding pipe sections together to form an underwater pipeline, the welding apparatus being arranged to weld pipe sections together when they are in a generally upright orientation with the bottom of an upper pipe section abutting the top of a lower pipe section that defines the end of the pipeline, the welding apparatus including:

a rotary equipment holder mounted for rotation about a generally vertical axis and having a central opening through which pipe sections are able to pass as a pipeline is laid, a plurality of welding heads angularly spaced about the rotary equipment holder, each head being associated with a respective sector of the rotary equipment holder, and a welding head guide assembly for fixing around a pipe section, the guide assembly including a guide track for guiding movement of each of the welding heads around the pipe section, the respective sector of the rotary equipment holder being able to revolve around the pipe section as the associated welding head revolves around the pipe section.

The invention makes it possible to operate a plurality of welding heads simultaneously around the pipeline thereby enabling the welding process to be speeded up considerably. At the same time the provision of the rotary equipment holder makes it possible to operate a plurality of welding heads without a risk of one welding head interfering with the operation of another.

Preferably the welding heads are arranged to be driven around the guide assembly. Such an assembly enables the path of movement of each welding head to be carefully controlled and also enables close control of the rotational speed of each welding head, enabling all heads to be rotated at the same speed.

In an embodiment of the invention described below with reference to the drawings, the welding head guide assembly is fixed around the pipe immediately below the joint to be welded (in that case, the assembly is fixed to the top of the pipeline); an alternative approach, which may sometimes be preferred, is to fix the assembly around the pipe immediately above the joint to be welded (in that case, the assembly is fixed to the bottom of the new pipe section being added to the pipeline).

The precise number of welding heads and their angular disposition around the pipeline can be chosen having regard to the needs of a particular application. Generally it will be preferable for at least two heads to be angularly spaced far apart from one another so that they can readily be operated without interfering with one another. The welding heads are preferably equiangularly spaced and in an embodiment of the invention described below three welding heads are provided. In other applications it may be preferable to employ two or four welding heads.

Preferably the gas and/or power supply equipment for each welding head is mounted on the respective sector of the rotary equipment holder with which the welding head is associated. In such a case the supply equipment is able to rotate on the rotary equipment holder in synchronism with the rotation of the welding heads around the pipeline. Preferably the connection of each welding head to its supply equipment is provided by a flexible umbilical connecting member. The flexible connecting member is able to compensate for any relative rotational movement between the welding head and its supply equipment (such rotational movement not being very great) and also to compensate for radial relative movement of the welding head and the supply equipment caused by the inclination of the pipeline. The supply equipment is preferably located around an outer region of the rotary equipment holder. The inner region above and or below the rotary equipment holder then remains free for an operator.

The apparatus is preferably arranged to be able to weld pipe sections together when they are in a generally upright orientation but at an inclination to the vertical and to the axis of rotation of the rotary equipment holder. Such a requirement is commonly required when using a "J-lay" technique of pipe laying.

The details of the construction of the welding head are not generally a significant part of the present invention. Whilst it is possible to employ an arrangement in which each welding head comprises a single welding torch, it is preferable that each welding head comprises a plurality of welding torches because this again enables the speed of welding to be greater. In an embodiment of the invention described below each welding head comprises two welding torches. The welding torches of the same welding head are preferably arranged to be moved around pipe sections in a fixed relationship to one another; it is, however, possible for there to be some limited relative movement of the welding torches belonging to the same welding head.

Preferably each welding head is mounted on a carriage arranged to be driven around the guide assembly and a control unit is provided for facilitating automatic guidance of a welding arc around the guide assembly, the control unit receiving signals representing electrical characteristics of the welding with regard to both the upper and lower pipe sections and controlling movement of the arc in dependence upon the signals received by the welding unit. Such an arrangement enables accurate welding to be undertaken and that again facilitates the operation of a plurality of welding heads.

The rotary equipment holder may be provided above or below the equipment: for example, the rotary equipment holder may be a platform on top of which gas and/or power supply equipment is supported; alternatively the rotary equipment holder may be an overhead carousel on which gas and/or power supply equipment is supported. In the case where an overhead carousel is provided, the apparatus preferably further includes a platform below the carousel for supporting personnel using the welding heads; the platform need not be mounted for rotation about any generally vertical axis.

The rotary equipment holder is preferably able to be moved into and out of position around the pipe without interfering with the pipe sections that are to be welded together.

According to the invention there is also provided a method of laying a pipeline underwater, in which pipe sections are welded together to form the pipeline, the method including the following steps:

providing a rotary equipment holder mounted for rotation about a generally vertical axis and having a central opening through which pipe sections are able to pass as a pipeline is laid, providing a plurality of welding heads angularly spaced about the rotary table, each head being associated with a respective sector of the rotary equipment holder, positioning the top of a pipeline onto which a pipe section is to be welded in the region of the middle of the rotary equipment holder, placing the bottom of a pipe section on the top of the pipeline, simultaneously using more than one of the welding heads to effect a welding action at angularly spaced regions of the junction between the bottom of the pipe section and the top of the pipeline, and simultaneously moving the welding heads around the junction, and rotating the rotary equipment holder during the simultaneous use of the welding heads.

Rotation of the rotary equipment holder enables any variation in the position of each welding head relative to the rotary equipment holder to be reduced or eliminated.

The method described above may be carried out employing a welding apparatus having any of the features described above.

The apparatus and method of the invention can be of particular advantage in the case where the bottom of the pipe section and the top of the pipeline are shaped such that placing of the bottom of the pipe section on the top of the pipeline defines an exterior circumferential groove therebetween and the width of the groove is substantially constant throughout its depth. In such a case, the amount of weld material required to fill a given length of the groove by a given depth remains substantially constant throughout the filling in of the groove. It is then possible to arrange for the rotational speed of the welding heads to be substantially constant throughout the welding of the joint.

Preferably the rotational speed of moving the welding heads around the junction between the bottom of the pipe section and the top of the pipeline is substantially the same as the rotational speed of the rotary equipment holder. Although it may be possible to provide the same prime mover both for driving the welding heads around the pipe and for driving the rotary equipment holder, it will usually be preferable to have separate drives. Control means for synchronising the drives may be provided.

The invention still further provides an underwater pipeline including a series of pipe sections welded together by a method as defined above.

BRIEF DESCRIPTION OF THE DRAWING FIGURES

Figure 2:
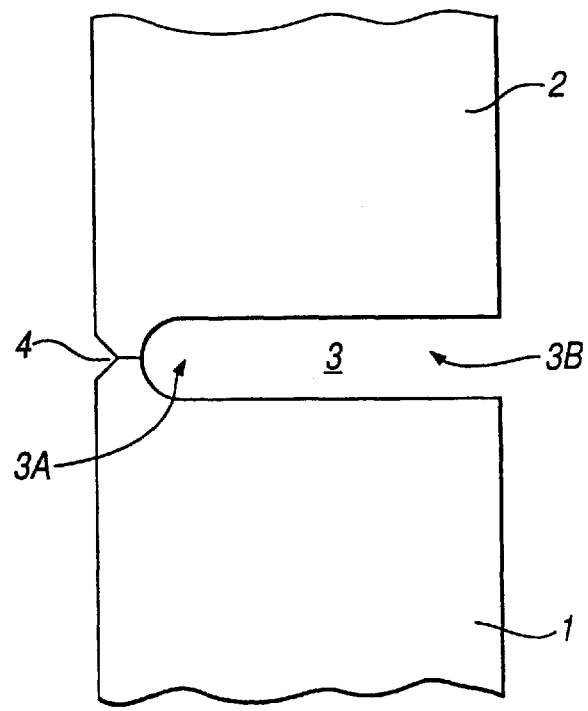
Figure 3:
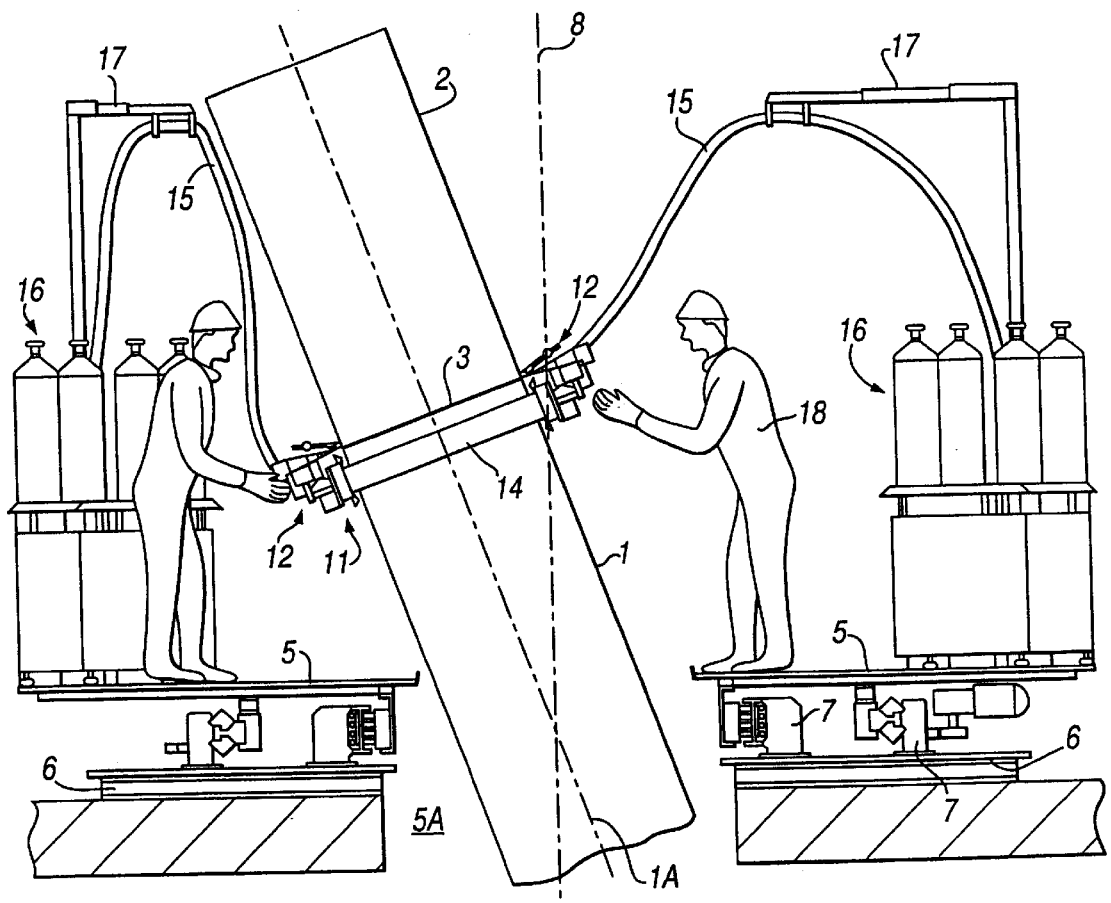
Figure 4:
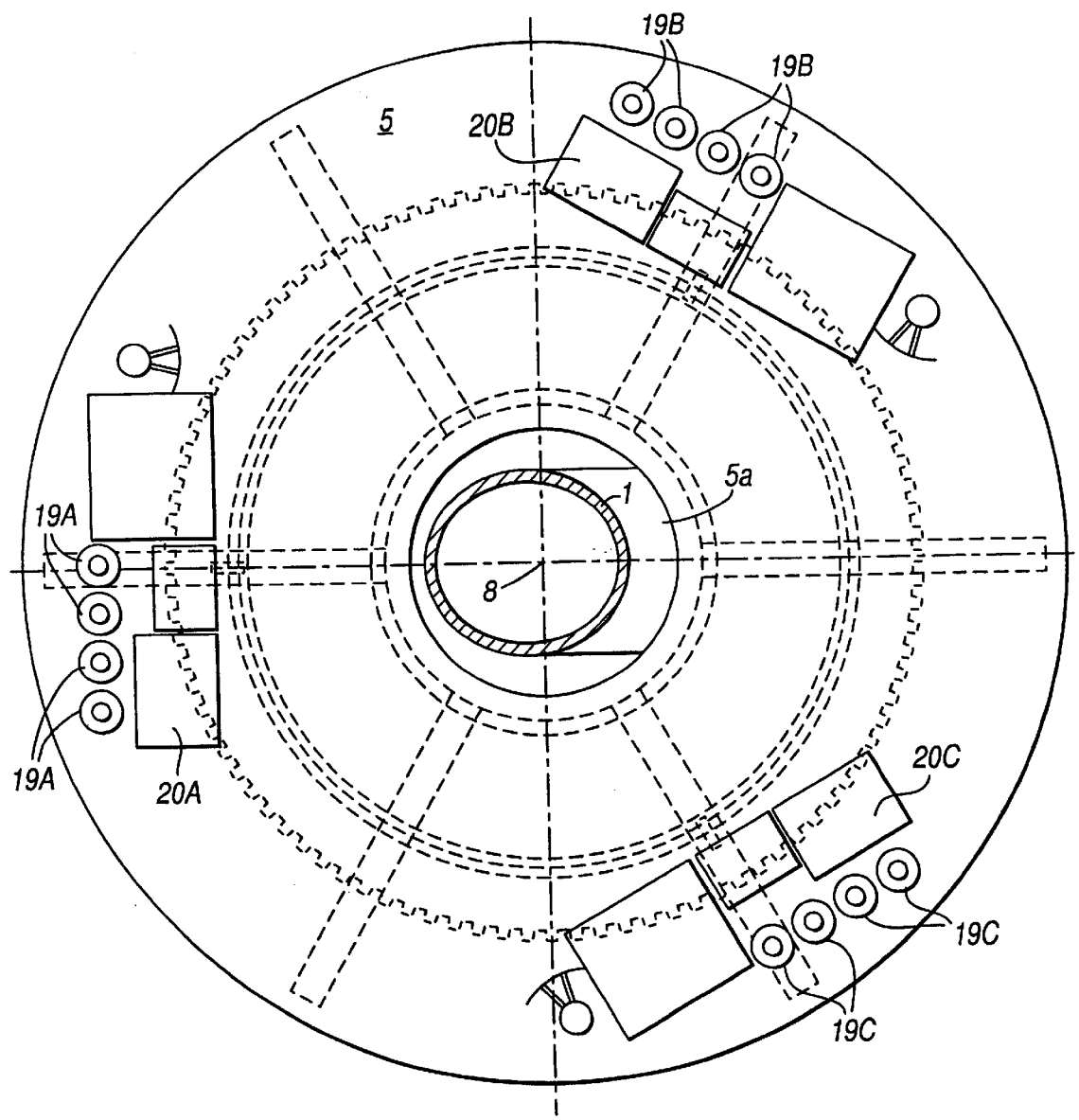
Figure 5:
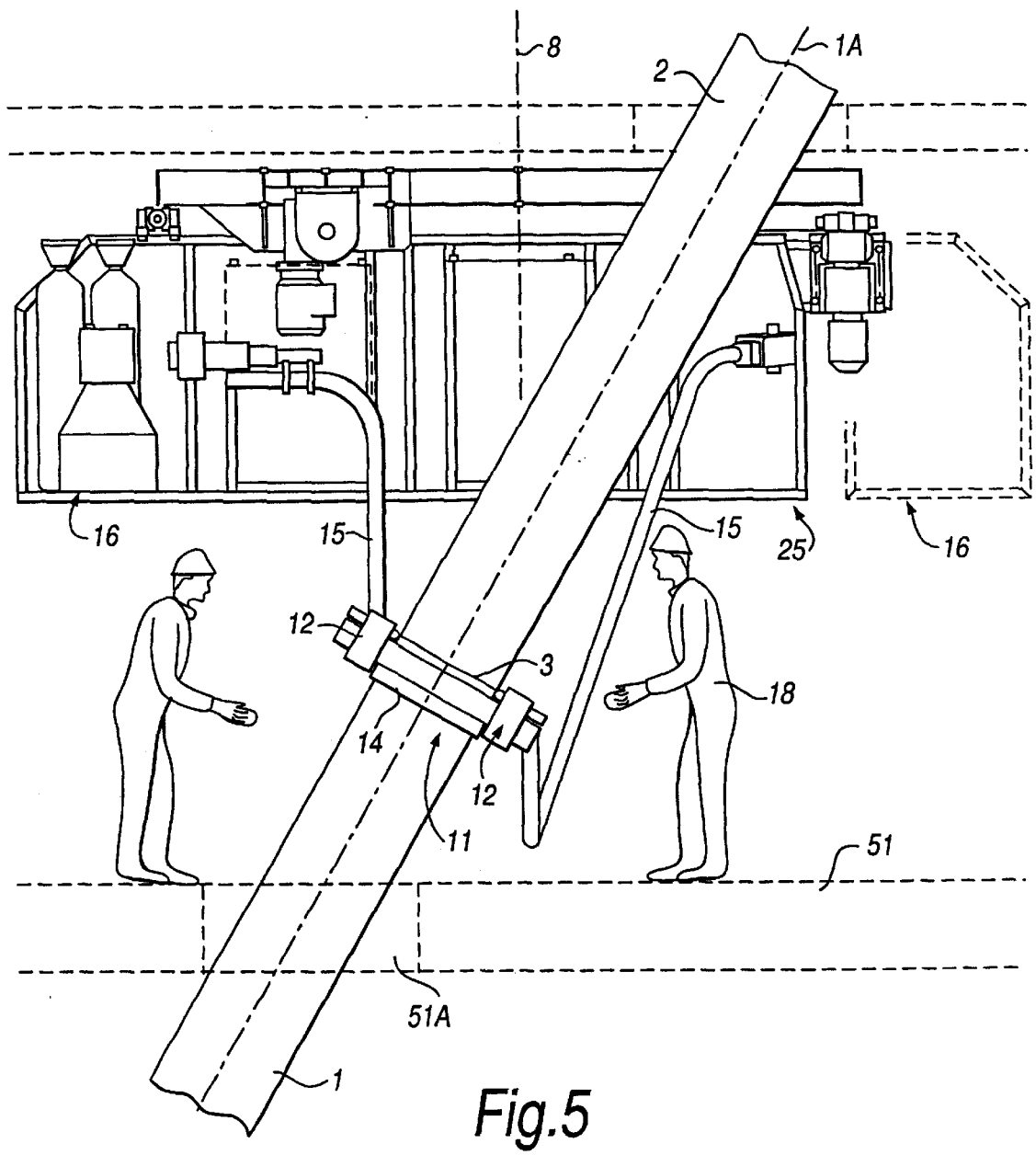
Figure 6:
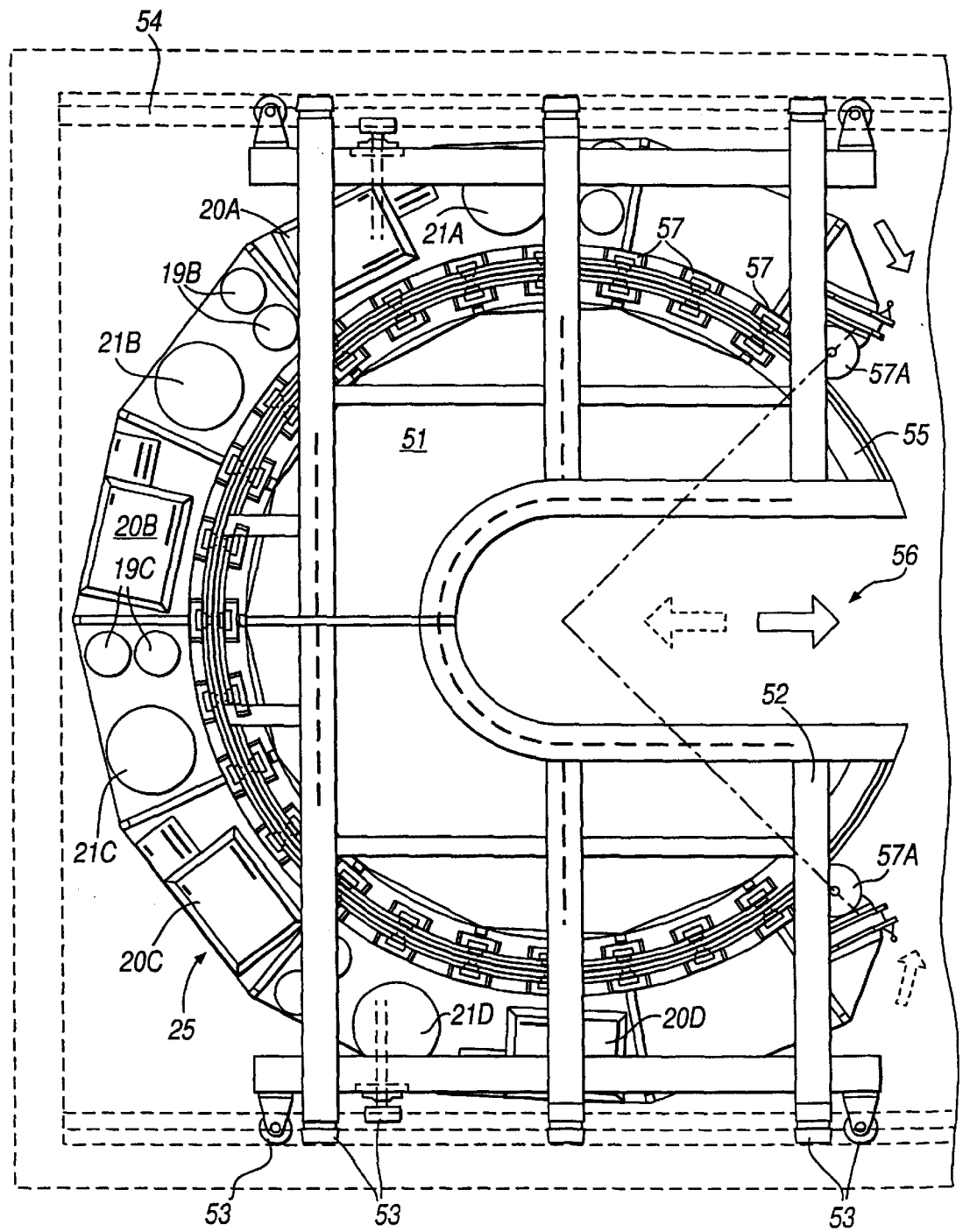
Figure 7:
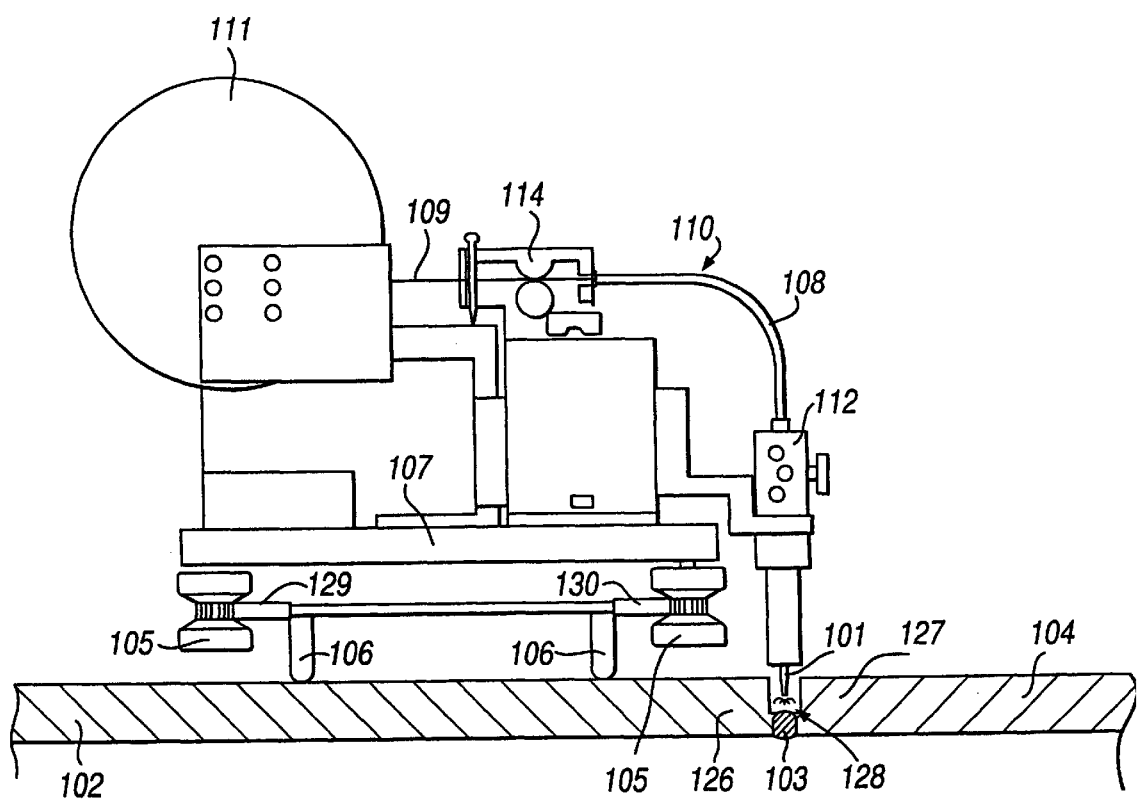
Figure 8:
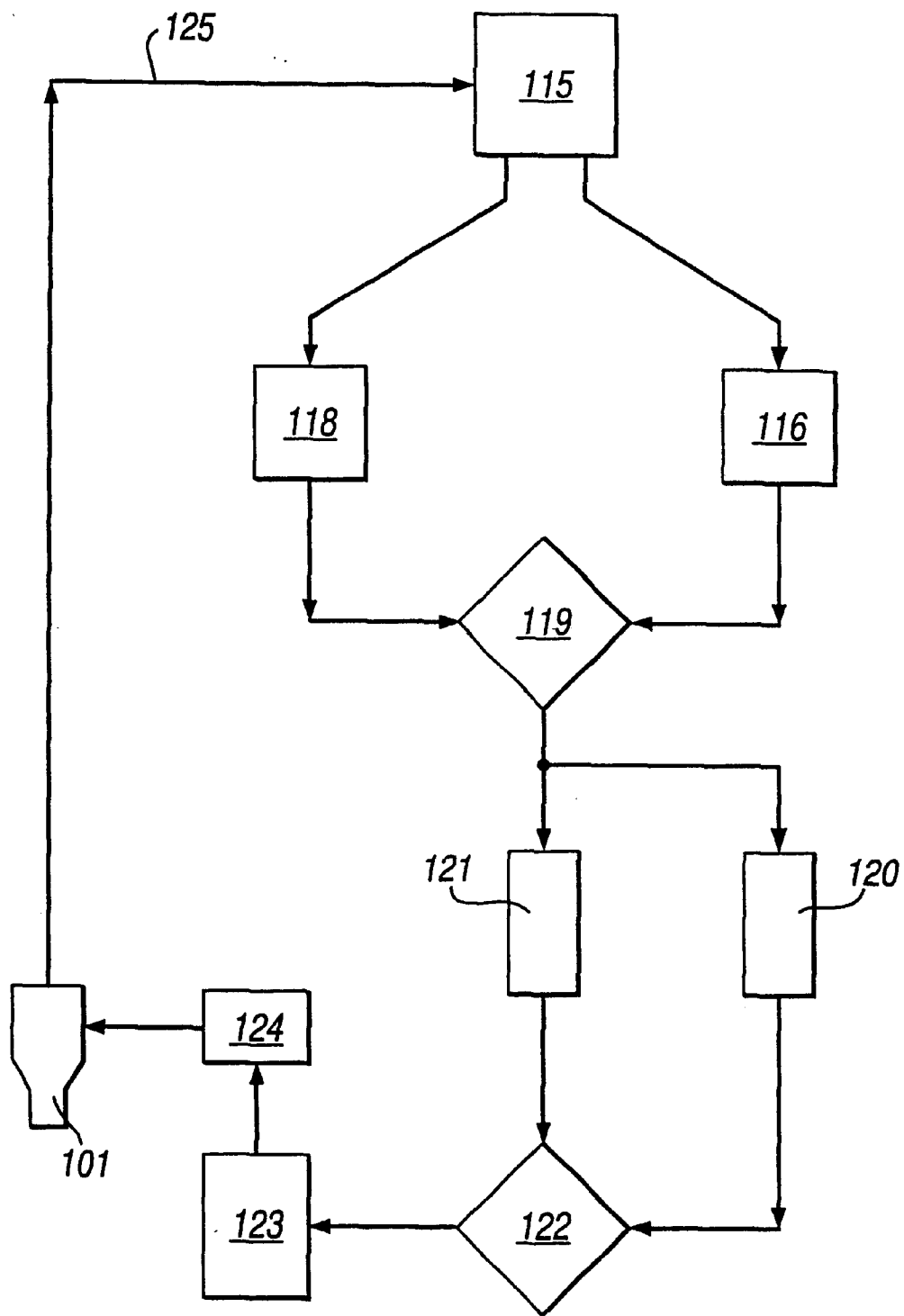

By way of example an embodiment of the invention will now be described with reference to the accompanying drawings, of which:

FIG. 1 is a sectional view through the side wall of the top of a pipeline and the bottom of a pipe section to be joined to the pipeline, the walls being shaped to define a groove of conventional shape, FIG. 2 is a sectional view through the walls of the top of a pipeline and the bottom of a pipe section to be joined to the pipeline, the walls being shaped to define a groove of special shape, FIG. 3 is a side view showing the bottom of a pipe section being welded onto the top of a pipeline using a rotary table in the form of a rotary platform as a rotary equipment holder, FIG. 4 is a plan view of a rotary table during the welding shown in FIG. 3, FIG. 5 is a side view similar to FIG. 3 but illustrating use of an overhead carousel as a rotary equipment holder, FIG. 6 is a plan view of the overhead carousel during the welding shown in FIG. 5, FIG. 7 is a schematic side view of a welding apparatus including two welding torches (only one of which is shown for the purpose of clarity), FIG. 8 is a schematic block diagram illustrating the automatic guidance system of the welding apparatus of FIG. 7, and FIG. 9 is a schematic perspective view of a modified form of welding apparatus including two welding torches.

DETAILED DESCRIPTION OF THE PREFERRED EMBODIMENTS

FIG. 1 shows a typical conventional joint, prior to welding, between the bottom of a pipe section 2 and the top of a pipeline 1 (itself formed from a series of pipe sections that have already been welded together). It will be seen that the pipe walls are bevelled so that a circumferential groove 3 is formed in one face (the exterior face) of the walls. On the interior face a much smaller 'V' shaped groove 4 is formed. The abutting ends of the pipe walls are bevelled so that the groove 3 is tapered and is relatively narrow at its innermost end 3A, but relatively wide at its outermost end 3B; in conventional joints, the angle of inclination of each end wall is typically in the range of 5° to 30° so that the total angle defined between the opposite walls of the groove 3 is in the range of 10° to 60°. By providing a flared groove of this kind, the insertion of weld material into the bottom of the groove is facilitated.

During welding, weld material is laid down in the groove by a welding torch passing around the groove and in a typical case the welding torch passes over the same part of the groove more than once in order to lay down more material and, finally, to fill the whole of the groove 3 and provide a strong weld between the two pipe sections. Of course, as the weld material is laid down the effective bottom of the groove moves outwards and, as it does so, the width of the groove at its bottom increases. As the width of the bottom of the groove increases, so the optimum speed of travel of the welding torch around the groove reduces; indeed the initial optimum speed (when first beginning to fill the groove 3) may be more than twice the final optimum speed (when the groove 3 is almost full).

FIG. 2 shows a different form of joint, prior to welding, between the bottom of a pipe section and the top of a pipeline and the same reference numerals are used in FIG. 2 to designate the corresponding parts. As can be seen from the drawing, in the case of the special joint shown in FIG. 2, the groove 3 is of constant width throughout its entire depth (apart from its extreme bottom which is rounded). With such a groove, the width of the bottom of the groove remains constant as it is filled in and consequently the optimum speed of travel of a welding torch around the groove remains constant throughout the welding process; for example, it is the same at the beginning of the process when welding is taking place in the innermost region 3A as it is at the end of the process when welding is taking place in the outermost region 3B. A weld joint that can be optimally formed by a welding torch travelling at constant speed throughout the welding process is of particular advantage when used with a particular form of welding apparatus that will now be described with reference to FIGS. 3 and 4.

FIG. 3 is a side view of a welding station on a vessel that is designed to lay pipelines by the technique known as "J laying". In that technique, the pipeline is arranged to leave the vessel that is laying it in a substantially upright orientation and the pipeline then curves round to a horizontal orientation at the seabed. In J laying, although the pipeline may be completely vertical on the vessel, it is more common for it to be inclined to the vertical, especially if the depth of the water in which the pipeline is being laid is relatively not very great. When J laying, it is necessary to add extra pipe sections to the pipeline with the pipe sections oriented vertically; thus it is not possible to have a whole series of welding stations along the length of the pipeline and it is important that the process of welding another pipe section (which may itself comprise a plurality of individual pipe lengths welded together) onto the pipeline can be carried out as quickly as possible.

In FIG. 3 reference numeral 1 designates the upper end of the pipeline being laid and reference numeral 2 designates the lower end of a pipe section 2 that is being welded to the pipeline 1. The pipeline 1 is held in position relative to the vessel by a suitable combination of clamps and/or tensioning rollers (not shown) mounted on the vessel and, during the welding process, the pipeline 1 is held in a fixed position relative to the vessel. The pipe section 2 is held by clamps in coaxial alignment with the upper end of the pipeline 1 and with the bottom of the pipe section 2 and the top of the pipeline 1 abutting one another and defining a circumferential groove 3 around the exterior of their junction as already described with reference to FIG. 2.

A rotary table 5 is provided around the pipeline 1 just below the junction with the pipe section 2. The table 5 has a central opening SA through which the pipeline 1 passes. The table 5 is mounted for rotation about a vertical axis 8 which intersects the longitudinal axis 1A of the upper end of the pipeline 1 and is inclined to it. In the particular example illustrated the angle of inclination is 20°, but it will be appreciated that this angle may vary. The table 5 is mounted on a frame 6 that is fixed to the vessel and guiding and driving means 7 is provided on the frame 6 for rotating the table 5 about the axis 8.

A welding assembly 11 is fixed around the top of the pipeline 1. The welding assembly comprises a circular guide track 14 extending around the pipeline just below the groove 3 and, in this example, two welding heads 12 at diametrically opposite positions. The welding heads 12 are mounted for movement around the guide track 14 and their movement is carefully controlled. Each welding head is itself of special construction as described below with reference to FIGS. 7 to 9.

Each welding head 12 is connected by an umbilical flexible connector 15 to its own supply equipment 16 which is mounted on an outer region of the rotary table. The supply equipment includes gas and electrical power supply equipment and the connector 15 extends in a substantially vertical radial plane between the equipment 16 and the welding head 12, and, as shown in FIG. 3, the connector 15 is held well above the table 5 by a telescopic arm 17 fixed to the table, so that a welding operator 18 is not affected by it.

FIG. 4 is a plan view of the rotary table. The set-up shown in FIG. 4 differs from that of FIG. 3 in that three welding heads 12A, 12B and 12C (not shown) are provided equiangularly spaced around the rotary table.

Each welding head 12A, 12B, 12C is provided with its own supply equipment comprising gas cylinders 19A, 19B, 19C (including some containing argon and some containing carbon dioxide), electrical generating equipment 20A, 20B and 20C for providing the electrical power required by each welding head and other equipment as required. That other equipment may include a supply of welding wire which is fed to the respective welding head through the connector 15.

The procedure for welding the pipe section 2 onto the top of the pipeline 1 will now be described, starting from the situation shown in FIG. 3 in which the upper end of the pipeline 1 is fixed in the position shown and the pipe section 2 is held by clamps (not shown) in abutment with and coaxially aligned with the upper end of the pipeline 1 and the welding assembly 11 is fixed in the position shown in FIG. 3 such that the welding torches of the welding heads 12 are aligned with the groove 3 at the junction of the pipe sections 1 and 2.

The weld between the pipe sections can be formed in one continuous operation. Each of the welding heads 12 is driven on its respective carriage around the guide track 14 at the same constant rotational speed. At the same time the rotary table 5 is driven at the same rotational speed around the axis 8. Thus the supply equipment 16 for each head 12 remains radially aligned with its head; as a result of the inclination of the pipeline, there is some movement of the head towards and away from the equipment 16 but that is accommodated by movement of the flexible connector 15. Initially, as already described, weld material is laid down in the innermost portion 3A of the groove, but as rotation continues and one welding head comes to a part of the groove that has already been passed over by another head the weld is built up towards the outermost portion 3B. During the entire process the rotational speed of both the welding heads 12 and the table 5 can be constant. If desired, the direction of rotation of the welding heads and the table 5 can be reversed periodically, although it will be understood that such reversal is not necessary from the point of view of maintaining the welding heads adjacent to their respective supply equipment.

Once the welded joint has been completed, the welding assembly 11 can be released from the pipeline, a further length of pipeline allowed to pass out from the vessel and the process repeated with the top of the pipe section 2 then defining the top of the pipeline 1.

Referring now to FIGS. 5 and 6 there is shown a modified form of the apparatus of FIGS. 3 and 4 where corresponding parts are designated by the same reference numerals. The description referring to FIGS. 5 and 6 will be confined mainly to the differences between the arrangement shown there and the arrangement already described with reference to FIGS. 3 and 4.

In the case of the apparatus shown in FIGS. 5 and 6, the supply equipment 16 is suspended from an overhead carousel 25 which is rotatable in the same way as the rotary table 5 in FIGS. 3 and 4. In this case, there is still a platform below the carousel on which users of the equipment may stand, that platform being designated by reference numeral 51 in FIG. 5. In this case, however, the platform 51 remains stationary as the welding heads and supply equipment suspended from the carousel rotate, so that a user wishing to watch a welding head must walk round the platform 51.

As can be seen most easily in FIG. 6, the overhead carousel 25 is mounted on a frame 52 which is slidably mounted via wheels 53 on a fixed support frame 54 shown in dotted outline in FIG. 6, whereby the carousel 25 can be moved horizontally away from its operative position, shown in FIGS. 5 and 6, to a position clear of the pipeline 1. That may be useful, for example, if it is desired to carry out other operations on a pipeline joint.

The frame 52 carries a circular guide track 55 interrupted in one region 56 to allow the guide track to be withdrawn horizontally on the frame 52 even when there is a pipe section passing vertically through the track. The carousel 25 is mounted for rotation on the guide track 55 by wheels 57 most of which rotate about horizontal axes but two of which (referenced 57A in FIG. 6) rotate about vertical axes. It will be understood that, although the guide track extends around only part of the pipe section, the carousel 25 is able to rotate through a full 360°.

The carousel 25 shown in FIG. 6 is equipped for the operation of four welding torches (in this particular example two welding heads, each of which has two torches). The carousel thus has four sets of supply equipment including gas cylinders 19A, 19B, 19C and 19D for each of the welding heads, electrical control and/or generating equipment 20A, 20B, 20C and 20D and welding wire supplies 21A, 21B, 21C and 21D.

As will be understood, the apparatus shown in FIGS. 5 and 6 operates in substantially the same way as the apparatus of FIGS. 3 and 4 and that operation will not be further described here. It should also be understood that whilst various modifications have been described with reference to FIGS. 5 and 6, it is possible to provide an apparatus that incorporates only some of those modifications. For example, the carousel 25 may be provided as an overhead carousel without providing an arrangement for enabling the carousel to be withdrawn while a pipe section is still present and extending vertically through it.

Referring now to FIG. 7, there is shown in partial cross-section the ends of the pipes 102, 104 to be welded together and a schematic side view of a welding apparatus 110 having two voltaic arc-welding torches 101 (only one of which can be seen in FIG. 1) for butt welding the pipes 102, 104 together. The welding torch is of the well known GMAW (gas metal arc welding) and can either be of the type used in MAG (metal active gas) welding or of the type used in MIG (metal inert gas) welding. The gas used may for example be carbon dioxide. It should be understood that the welding apparatus 110 corresponds to one of the welding heads 12 shown in FIGS. 3 to 6 and that the pipes 102, 104 correspond to the pipeline 1 and the pipe section 2 respectively of FIGS. 1 to 6.

The pipes 102, 104 are arranged with their axes aligned and their ends 126, 127 next to each other. The ends 126, 127 of the pipes are bevelled so that when brought together they define a circumferentially extending exterior groove 128.

A track 106 (corresponding to the track 14 of FIGS. 3 and 5) is fixedly mounted as a single unit on the left hand pipe 102 (as viewed in FIG. 7). The track 106 extends circumferentially around the pipe 102. The track 106 has two guide tracks 129, 130 that extend around the pipe 102. The welding apparatus 110 is mounted for movement along the track 106. Wheels 105 are rotatably mounted on a base plate 107 of the welding apparatus 110. The wheels 105 engage with the guide tracks 129, 130 and facilitate the guided movement of the apparatus 110 along the track 106. One of the tracks 130 also provides a toothed rack that extends around the pipe. A pinion wheel (not shown), mounted for engagement with the rack, is driven so that the apparatus may be driven around the pipe 102. The driven pinion wheel may be rotated via a driven chain, which is in turn driven by a stepper motor, or similar driving source (not illustrated). The track 106 is so positioned on the pipe 102 that the torches 101 of the apparatus 110 are each positioned directly over the groove 128. Such methods of positioning a track and a welding apparatus on a pipe so that a torch of the welding apparatus is correctly positioned over the weld joint to be formed are well known and are therefore not described here in further detail.

In use, the apparatus 110 is driven around the pipes 102, 104 and the welding torches 101 are operated and controlled so that they deposit weld material in the centre of the groove 128 to form a weld joint 103. The weld torches are arranged next to each other. When the apparatus is started up the first torch (the torch at the front in respect of the initial direction of motion of the torches) is operated first and the other torch is not operated until it reaches the start of the weld laid down by the first torch. Then, as the apparatus 110 passes along the groove 128, weld material is deposited in the groove by the first torch to form the weld joint 103 and shortly thereafter further weld material is deposited on top of the weld joint 103 by the second torch. The apparatus 110 performs several passes depositing further layers of weld material in the groove to join the pipes together. The welding apparatus 110 rotates in both directions around the circumference of the pipes 102, 104. The welding apparatus 110 moves around the pipes 102, 104 in one direction (i.e. clockwise or anticlockwise) until it has moved around the entire circumference of the pipes at least once.

Both torches 101 function in a similar way. The following description relates to only one of the two torches and its guidance system, but it will be understood that the other torch functions in substantially the same way.

Welding wire 109 is continuously fed from a spool 111 of wire to the torch 101. The welding wire 109 is unwound from the wire spool 111 by means of a pulling device 114 which conveys the wire 109 via a guiding pipe 108 to a straining device 112, from where the wire is fed into the torch 101.

The welding of the pipes 102 and 104, by the welding torch is controlled by an automatic guidance system. The guidance system guides the welding torch by ascertaining electrical parameter values relating to the voltaic arc impedance. The arc impedance depends on, inter alia, the position of the welding arc in relation to the walls defining the groove 128. If the arc lies in the notional central plane (containing the centre line of the groove 128) halfway between the walls of the groove 128, then the influence of those walls on the above electrical parameters is practically identical. On the other hand, if the arc of the voltaic torch 101 is not positioned directly in the centre of the groove 128 the influence of the walls of the groove on the electrical parameter values will be different. Monitoring the magnitudes of an electrical parameter ascertained enables the control unit (not shown in FIG. 7) of the apparatus to calculate the deviation from the central position of the arc of the torch 101 in the groove 128. More specifically the magnitude of the values of voltage, current and impedance (V, I, R) relating to one wall of the groove 128 are compared with those relating to the other wall of the groove during the continuous movement of the torch 101. The voltage and current of the arc is measured with equipment attached to or in the welding torch and the arc impedance can then be calculated using those measured values. The method of ascertaining those values in respect of a given wall of the groove 128 is explained below with reference to FIG. 2.

If the arc is in an off-centre position, in that the arc, the end of the wire 109 and welding bath are closer to one of the walls of the groove there will be a decrease in the voltaic arc impedance with respect to the opposite wall, since the welding apparatus is such that the voltage value is caused to decrease and the current intensity is caused to increase. Corrections in the orientation and position of the torch 101 in relation to the groove 128 and the weld 103 are achieved with the automatic guidance system in real time.

The block diagram of FIG. 8 illustrates schematically the automatic guidance system of the welding apparatus (illustrated by FIG. 7). Each torch is provided with a guidance system, but the system is illustrated and described with reference to a single torch only for the sake of simplicity.

The guidance system periodically ascertains the electrical parameter values of voltage, current intensity and voltaic arc impedance relating to the right wall and left wall which define the groove 128 (see FIG. 1). The welding torch is oscillated so that the position of the arc oscillates with a small amplitude (less than a tenth of a millimeter) in a direction substantially parallel to the axis of the pipe (so that the arc moves towards and away from each wall). The arc voltage and current are measured practically continuously and signals corresponding to those measured values are passed from the torch 101 via a cable 125 to a governing unit 115. The governing unit 115 includes a processing means, which processes the signals. The governing unit 115 sends signals representative of the electrical parameter values measured for the left and right walls to two digital filters 116, 118, one filter 116 for generating signals relating to the right wall and one filter 118 for the left wall. The governing unit 115 and filters 116, 118 are thus able effectively to extract, from the signals from the torch 101, signals corresponding to values of the parameters measured in respect of the arc in relation to the left wall and right wall, respectively, of the groove 128. Output signals are thus produced by the filters 116, 118 relating to the voltage, current and impedance values relating to their respective wall of the groove.

A difference unit 119 calculates an indication of the position in the groove of the arc of the torch by calculating the differences in the values relating to the left and right walls respectively, determined from the signals received from the filters 116, 118. The calculations, which are made practically continuously, are used in real time for controlling the position and orientation of the torch 101 in relation to the groove 128.

If the calculations made, indicate that the difference in desired position of the arc and the actual position of the arc is greater than a fixed and preset threshold distance, then a signal is generated which causes a gain unit 121 to activate a command signal, which by means of an amplifier 122, causes a drive unit 123 in association with a centring regulation unit 124 to move the welding torch 101, so that the arc is moved towards the desired location (the centre line of the groove).

If the calculations made (by the difference unit 119) indicate that the difference in desired position of the arc and the actual position of the arc is less than or equal to the preset threshold distance, the gain unit 121 does not cause the torch to be moved. However signals representing the difference values calculated by the difference unit 119 are sent to an integrator unit 120 that is also provided to regulate the positioning of the torch 101 during the welding process. If the position of the arc remains near the central line of the groove 128, and the sum of the distances to the left of the line is practically equal, over time, to the sum of the distances to the left of the line the integrator 120 will not generate any centring movement command signal through the amplifier 122. However, if the position of the arc, although remaining within the tolerated range of distances from the central line of the groove, is found to be prevalently to one side of the line, then the integrator 120 activates a command signal, which by means of the amplifier 122, causes the drive unit 123 and centring regulation unit 124 to move the welding torch 101, so that the arc is moved towards the desired location (the centre line of the groove).

The calculations performed by the automatic guidance system may include performing comparisons between calculated values relating to the actual state of the welding system and sample values held in the memory of the guidance system. Such sample values may be entered into the memory manually by keyboard.

FIG. 9 shows schematically a modified form of welding apparatus 210. The apparatus 210 operates in a similar manner to that of the apparatus 110 described above. The welding torches 201 are aligned so that when the apparatus 210 is mounted on a pipe (not shown in FIG. 9) they both point towards the same notional circumferential line extending around the pipe. Wheels 205 are provided for engaging with a guide track (not shown in FIG. 9) that, in use, extends around one of the pipes to be welded.

The main differences between the apparatus 210 and the apparatus 110 will now be described.

The welding wire (not shown) of the apparatus 210 is not provided on the moving part of the apparatus, rather it is mounted at a location remote from the apparatus, and fed from that remote location, via a guide pipe (the connector 15), to the welding apparatus as it moves around the pipe.

The torches 201 are each water cooled. The water is pumped around a cooling system (not shown) including parts of the torch. The water heated by the operating torch passes into a heat exchanger, such as a radiator, so that it is cooled.

Appropriate control means may be provided for synchronising the rotation of the rotary table 5 and the welding assembly 11 and it will be seen that, if desired, the degree of operator involvement in the process can be very limited. The number of welding heads 12 used at any one time is preferably at least two but three or more may be used. If three heads are provided, then even if one of them is damaged, the other two may be used simultaneously and that alone enables a considerable increase in welding speed to be achieved.

We claim:

1. A welding apparatus for welding pipe sections together to form an underwater pipeline, the welding apparatus being arranged to weld pipe sections together when they are in a generally upright orientation with the bottom of an upper pipe section abutting the top of a lower pipe section that defines the end of the pipeline, the welding apparatus including:
a rotary equipment holder mounted for rotation about a generally vertical axis and having a central opening through which pipe sections are able to pass as a pipeline is laid,
a plurality of welding heads angularly spaced about the rotary equipment holder, each head being associated with a respective sector of the rotary equipment holder, and
a welding head guide assembly for fixing around a pipe section, the guide assembly including a guide track for guiding movement of each of the welding heads around the pipe section, the respective sector of the rotary equipment holder being able to revolve around the pipe section as the associated welding head revolves around the pipe section.

2. The apparatus according to claim 1, in which the welding heads are arranged to be driven around the guide assembly.

3. The apparatus according to claim 2, in which each welding head is mounted on a carriage arranged to be driven around the guide assembly and a control unit is provided for facilitating automatic guidance of a welding arc around the guide assembly, the control unit receiving signals representing electrical characteristics of the welding with regard to both the upper and lower pipe sections and controlling movement of the arc in dependence upon the signals received by the welding unit.

4. The apparatus according to claim 1, in which the plurality of welding heads include a first welding head and a second welding head angularly spaced more than 90° apart around the axis of rotation of the rotary equipment holder.

5. The apparatus according to claim 1, in which the plurality of welding heads include two, three or four equiangularly spaced heads.

6. The apparatus according to claim 1, in which gas and/or power supply equipment for each welding head is mounted on the respective sector of the rotary equipment holder with which the welding head is associated.

7. The apparatus according to claim 6, in which the connection of each welding head to its supply equipment is provided by a flexible umbilical connecting member.

8. The apparatus according to claim 6, in which the supply equipment is located around an outer region of the rotary equipment holder.

9. The apparatus according to claim 1, in which the apparatus is arranged to be able to weld pipe sections together when they are in a generally upright orientation but at an inclination to the vertical and to the axis of rotation of the rotary table.

10. The apparatus according to claim 1, in which each welding head comprises a single welding torch.

11. The apparatus according to claim 1, in which each welding head comprises a plurality of welding torches.

12. The apparatus according to claim 11, in which the welding torches of the same welding head are arranged to be moved around the pipe sections in a fixed relationship to one another.

13. The apparatus according to claim 1, in which the rotary equipment holder is a platform on top of which gas and/or power supply equipment is supported.

14. The apparatus according to claim 1, in which the rotary equipment holder is an overhead carousel on which gas and/or power supply equipment is supported.

15. The apparatus according to claim 14, further including a platform below the carousel for supporting personnel using the welding heads.

16. The apparatus according to claim 15, in which the platform is not mounted for rotation about any generally vertical axis.

17. The apparatus according to claim 1, in which the rotary equipment holder is able to be moved into and out of position around the pipe without interfering with the pipe sections that are to be welded together.

18. A method of laying a pipeline underwater, in which pipe sections are welded together to form the pipeline, the method including the following steps:

providing a rotary equipment holder mounted for rotation about a generally vertical axis and having a central opening through which pipe sections are able to pass as a pipeline is laid, providing a plurality of welding heads angularly spaced about the rotary equipment holder, each head being associated with a respective sector of the rotary equipment holder, positioning the top of a pipeline onto which a pipe section is to be welded in the region of the middle of the rotary equipment holder, placing the bottom of a pipe section on the top of the pipeline, simultaneously using more than one of the welding heads to effect a welding action at angularly spaced regions of the junction between the bottom of the pipe section and the top of the pipeline, and simultaneously moving the welding heads around the junction, and rotating the rotary equipment holder during the simultaneous use of the welding heads to limit any variation in the position of each welding head relative to the rotary equipment holder.

19. The method according to claim 18, employing a welding apparatus according to claim 1.

20. The method according to claim 18, in which the placing of the bottom of the pipe section on the top of the pipeline defines an exterior circumferential groove therebetween and the width of the groove is substantially constant throughout its depth.

21. The method according to claim 18, in which the rotational speed of moving the welding heads around the junction between the bottom of the pipe section and the top of the pipeline is substantially the same as the rotational speed of the rotary equipment holder.

22. The method according to claim 18, in which the rotational speed of the welding heads is substantially constant throughout the welding of the joint.

23. An underwater pipeline including a series of pipe sections welded together by a method according to claim 18.

24. A welding apparatus for welding pipe sections together to form an underwater pipeline, said welding apparatus being arranged to weld pipe sections together when they are in a generally upright orientation with the bottom of an upper pipe section abutting the top of a lower pipe section that defines the end of the pipeline, said welding apparatus including:

a rotary equipment holder mounted for rotation about a generally vertical axis and having a central opening through which pipe sections are able to pass as a pipeline is laid, a plurality of welding heads angularly spaced about said rotary equipment holder, each head being associated with a respective sector of said rotary equipment holder, and a welding head guide assembly for fixing around a pipe section, said guide assembly including a guide track for fixing on said pipe section and for guiding movement of each of said welding heads around said pipe section, such movement of the welding heads being able to be independent of the rotation of the rotary equipment holder, wherein each respective sector of said rotary equipment holder is able to revolve around said pipe section as the associated welding head revolves around said pipe section.

25. A welding apparatus for welding pipe sections together to form an underwater pipeline, said welding apparatus being arranged to weld pipe sections together when they are in a generally upright orientation with the bottom of an upper pipe section abutting the top of a lower pipe section that defines the end of the pipeline, said welding apparatus including:

a rotary equipment holder mounted for rotation about a generally vertical axis and having a central opening through which pipe sections are able to pass as a pipeline is laid, a plurality of welding heads and a plurality of carriages, each head being mounted on a respective carriage, and each head being capable of producing at least one welding arc, a welding head guide assembly including a guide track, said welding head guide assembly being fixable around a pipe section, the carriages being drivable along said guide track and around said guide assembly a control unit for facilitating, in use, automatic guidance of the arcs of said welding heads, said control unit being able to receive signals representing electrical characteristics of the welding with regard to both the upper and lower pipe sections and to control movement of said arcs of said welding heads in dependence upon the signals received by said control unit, said apparatus being so arranged that, when said apparatus is used to weld such an upper pipe section to the top of such a lower pipe section that defines the end of a pipeline and said welding head guide assembly and guide track are fixed to at least one of said pipe sections, said carriages are angularly spaced about said rotary equipment holder and are each associated with a respective sector of said rotary equipment holder, each respective sector of the rotary equipment holder being able to revolve around said generally vertical axis as the associated carriage and welding head mounted thereon revolve around said pipe sections.

26. A welding apparatus for use in a method of forming an underwater pipeline, said apparatus being arranged to be able to weld a circumferential joint between a pipe section and a pipeline wherein the axis of said joint to be welded is generally upright, said welding apparatus including:

a platform on top of which units of gas and/or power supply equipment are supported, said platform being mounted for rotation about a substantially vertical axis and having a central opening through which pipe sections are able to pass as a pipeline is formed, a plurality of welding heads angularly spaced about said platform, each head being associated with a respective sector of said platform and being connected to at least one of said units of equipment, and a welding head guide means able, in use, to guide movement of each of the welding heads around and along said joint to be welded, each welding head being able to revolve around said pipe section together with its associated respective sector of said platform, said apparatus being so arranged that, in use, personnel using said welding heads may be supported by said platform.

27. A welding apparatus for use in a method of forming an underwater pipeline, said apparatus being arranged to be able to weld a circumferential joint between a pipe section and a pipeline wherein the axis of said joint to be welded is generally upright, said welding apparatus including:

an overhead carousel on which units of gas and/or power supply equipment is supported, said carousel being mounted for rotation about a substantially vertical axis and having a central opening through which pipe sections are able to pass as a pipeline is formed, a plurality of welding heads angularly spaced about said carousel, each head being associated with a respective sector of said carousel and being connected to at least one of said units of equipment, a welding head guide means able, in use, to guide movement of each of the welding heads around and along said joint to be welded, each welding head being able to revolve around said pipe section together with its associated respective sector of said carousel, and a platform mounted below said carousel, said apparatus being so arranged that, in use, personnel using said welding heads may be supported by said platform.

28. A welding apparatus according to claim 26 or claim 27, wherein said guide means comprises a welding head guide assembly which, in use, is fixed around or next to said joint to be welded, said guide assembly including a guide track for guiding movement of each of said welding heads around and along said joint to be welded.

29. A welding apparatus according to claim 28, wherein said guide track is, in use, secured in fixed position directly to either or both of said pipe section and said pipe-line.

30. A welding apparatus according to claim 28, wherein each of said plurality of welding heads is able to revolve around said pipe section with, but independently of, its associated units of gas and/or power supply equipment.

31. A method of laying a pipeline underwater, in which pipe sections are welded together to form the pipeline, the method including the following steps:

providing a rotary equipment holder mounted for rotation about a generally vertical axis and having a central opening through which pipe sections are able to pass as a pipeline is laid, providing a plurality of welding heads angularly spaced about said rotary equipment holder, each head being associated with a respective sector of said rotary equipment holder, positioning the top of a pipeline onto which a pipe section is to be welded in the region of the middle of said rotary equipment holder, placing the bottom of a pipe section on the top of said pipeline, fixing a welding head guide track around and to either or both of said pipe section and said pipeline, simultaneously using more than one of said welding heads to effect a welding action at angularly spaced regions of the junction between said bottom of said pipe section and said top of said pipeline, and simultaneously moving said welding heads along said guide track and around said junction, and rotating the rotary equipment holder during the simultaneous use of the welding heads to limit any variation in the position of each welding head relative to the rotary equipment holder.

32. A method of laying a pipeline underwater, in which pipe sections are welded together to form the pipeline, said method including the following steps:

providing a rotary equipment holder mounted for rotation about a generally vertical axis and having a central opening through which pipe sections are able to pass as a pipeline is laid, providing a plurality of welding heads angularly spaced about said rotary equipment holder, each head being associated with a respective sector of said rotary equipment holder, providing a guidance control unit, positioning the top of a pipeline, onto which a pipe section is to be welded, in the region of the middle of said rotary equipment holder, placing the bottom of said pipe section on the top of said pipeline, said pipeline and said pipe section being so shaped that an exterior circumferential groove is defined therebetween, mounting, on either or both of said pipe section and said pipeline, a welding head guide assembly including a guide track for guiding movement of each of said welding heads around the groove, simultaneously using more than one of said welding heads to effect a welding action at angularly spaced regions of said groove, and simultaneously moving said welding heads relative to said guide track and around said groove, said guidance control unit automatically guiding the movement of said welding heads along the centre of said groove in dependence on signals received by said guidance control unit, said signals representing electrical characteristics of the welding with regard to both said pipeline and said pipe section, and rotating said rotary equipment holder during the simultaneous use of said welding heads to limit any variation in the position of each welding head relative to said rotary equipment holder.

* * * * *